No. 637,867. Patented Nov. 28, 1899.
J. H. HARTZELL.
TRUCK.
(Application filed Apr. 10, 1899.)
(No Model.)
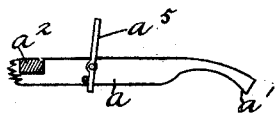
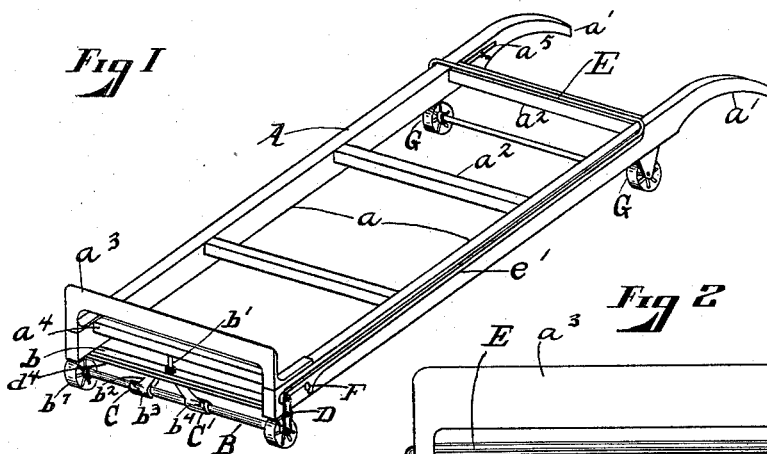
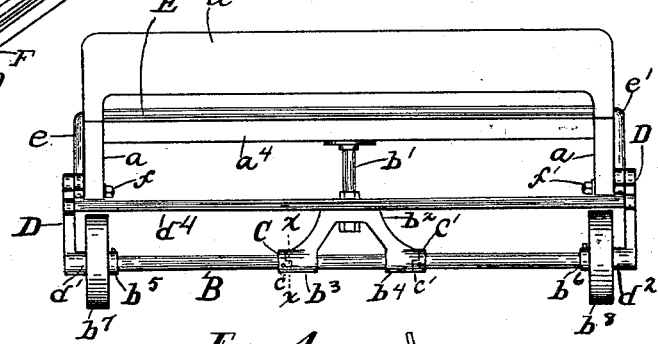
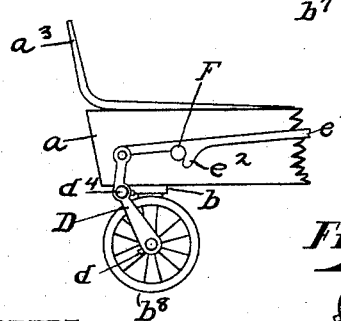
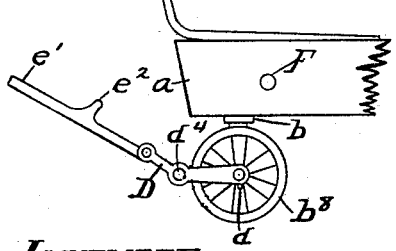
WITNESSES
Walter F. Murray
Emma Lyford
INVENTOR
James H. Hartzell
By Geo. F. Murray
Atty
THE NORRIS PETERS CO., PHOTO-LITHO., WASHINGTON, D. C.

UNITED STATES PATENT OFFICE.

JAMES H. HARTZELL, OF CINCINNATI, OHIO.

TRUCK.

SPECIFICATION forming part of Letters Patent No. 637,867, dated November 28, 1899.

Application filed April 10, 1899. Serial No. 712,409. (No model.)

*To all whom it may concern:*

Be it known that I, JAMES H. HARTZELL, a citizen of the United States, and a resident of Cincinnati, in the county of Hamilton and State of Ohio, have invented certain new and useful Improvements in Trucks, of which the following is a specification.

The object of my invention is a truck which may be changed readily from a two-wheeled or hand truck, in which form the front axle is rigid, to a four-wheeled truck, in which the front axle is free to turn in a horizontal plane, the change to be accomplished by the swinging forward of the bail, which in the forward position serves as a thill for the four-wheeled truck. This object is attained by the means described in the annexed specification and illustrated in the accompanying drawings, in which—

Figure 1 is a perspective view of a truck embodying my invention, the bail being thrown back as it is when the device is used as a two-wheeled truck. Fig. 2 is a front elevation of the same upon an enlarged scale. Fig. 3 is a detail side elevation, the rear part of the truck and the bail being broken off. Fig. 4 is a similar view with the bail thrown forward as when it is used as a four-wheeled truck. Fig. 5 is a detail sectional view through line $x$ $x$ of Fig. 2. Fig. 6 is a similar view taken when the bail is thrown forward as in Fig. 4, showing the means of limiting the rotation of the front axle. Fig. 7 is a detail view showing one of the swinging standards in its raised position.

Referring to the parts, which are indicated by similar reference-letters wherever they occur throughout the various views, the frame A is similar to that of an ordinary truck and consists of side beams $a$, turned at their ends into handles $a'$ and connected by braces $a^2$ and having at its forward end a nose $a^3$. Secured between the front brace $a^4$ and a metal cross-bar $b$, which is secured to the under side of the cross-beams $a$, and passing downwardly through a central perforation in the bar $b$ is a pin $b'$, upon the lower projecting end of which is swiveled a hanger $b^2$, which has downwardly-projecting arms which terminate in perforated bosses $b^3$ and $b^4$, in which is journaled the front axle B, which has collars C and C' secured to it by set-screws or rivets. These collars have teeth or detents $c$ and $c'$, which enter depressions in the collars $b^3$ and $b^4$ to limit the rotation of the axle B, to each of whose ends angle-levers D D are secured by set-screws $d$. Between the bosses $d'$ and $d^2$ of the levers and the collars $b^5$ and $b^6$, secured to the axle near its ends, the front wheels $b^7$ and $b^8$ of the truck are journaled. The angle-levers D D are connected by a cross-rod $d^4$ and at their upper ends are pivoted to the arms $e$ and $e'$, respectively, of the bail E. Near the forward ends of the arms $e$ and $e'$ are short arms $e^2$ to pass over studs F and lock the bail when it is thrown back. The studs F pass through the side beams $a$ and have nuts $f$ and $f'$ upon their inner screw-threaded ends.

When the bail is thrown back and locked, its arms $e$ and $e'$, bearing firmly against the side beams $a$, hold the levers D D, the hanger $b$, and the axle B rigid, and the device may then be used as a two-wheeled or hand truck. When the bail is thrown forward, the angle-levers D D descend free of the side beams to the position shown in Fig. 4, further motion toward the ground being checked by the detents $c$ $c'$ bearing against the walls of the depressions in the collars $b^3$ and $b^4$, as shown in Fig. 6. The hanger $b$, and with it the axle B, being now free to rotate in a horizontal plane, the truck may be used as a four-wheeled truck, resting upon the front wheels $b^7$ and $b^8$ and the rear wheels G G and drawn forward or pushed backward by the bail E as a thill.

When used as a four-wheeled truck, the swinging standards $a^5$ (shown in the lowered position in Fig. 1) may be raised, as shown in Fig. 7, to prevent rails or whatever may be piled upon the truck from sliding off of it.

What I claim is—

1. In an interchangeable two or four wheeled truck the combination of the frame, wheels secured to the rear end thereof, a hanger swiveled to the forward end thereof, the axle journaled therein, the wheels journaled upon the axle, the levers secured to the ends of the axle and the bail pivoted thereto which, when thrown backward, holds the hanger rigid and when thrown forward releases the hanger, substantially as shown and described.

2. In a truck the combination of the frame, the hanger swiveled to the front end thereof, the front axle journaled in the hanger, wheels journaled upon the axle, levers secured to the ends of the axle and the bail pivoted to the ends of the levers, which in its backward position bears against the sides of the frame and holds the hanger rigid, substantially as shown and described.

3. In a truck the combination of the frame, the cross-bar secured at its forward end, the pin passing through the cross-bar, the hanger swiveled thereon, the front axle journaled in the hanger, the collars secured to the axle, the detents fitting in depressions in the hanger to limit the rotation of the axle, the wheels journaled upon the axle, the angle-levers secured upon the ends thereof, the bail pivoted to the ends of the levers bearing in its backward position against the sides of the frame and holding the front axle rigid and in its forward position releasing the hanger, and the wheels secured to the rear of the frame, substantially as shown and described.

4. In an interchangeable two or four wheeled truck the combination of the frame, the hanger swiveled to the forward end of the frame, the axle journaled therein, the wheels journaled upon the axle, levers secured to the ends of the axle, the bail pivoted thereto which when thrown backward holds the hanger rigid and when thrown forward releases the hanger, the wheels secured to the rear of the frame and the swinging standards pivoted to the rear ends of the side beams, substantially as shown and described.

JAMES H. HARTZELL.

Witnesses:
WALTER F. MURRAY,
GEO. J. MURRAY.